(12) United States Patent
Hojabri et al.

(10) Patent No.: US 7,277,135 B1
(45) Date of Patent: Oct. 2, 2007

(54) VIDEO DISPLAY SIGNAL BRIGHTNESS CONTROL CIRCUIT

(75) Inventors: Peyman Hojabri, San Jose, CA (US); Hon Kin Chiu, Castro Valley, CA (US); Robert Eddy, San Jose, CA (US); Leonard Stencel, Yucca Valley, CA (US); Wayne Harlan, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 433 days.

(21) Appl. No.: 10/897,522

(22) Filed: Jul. 23, 2004

(51) Int. Cl.
*H04N 5/57* (2006.01)
(52) U.S. Cl. .................................................. 348/687
(58) Field of Classification Search ................ 348/380, 348/377, 381, 673, 687; 315/381, 382.1, 315/383
See application file for complete search history.

(56) References Cited

U.S. PATENT DOCUMENTS

| | | | | | |
|---|---|---|---|---|---|
| 3,873,767 | A | * | 3/1975 | Okada et al. ................ 348/673 |
| 4,209,808 | A | * | 6/1980 | Harwood ..................... 348/380 |
| 4,253,121 | A | * | 2/1981 | Avery .......................... 348/380 |
| 4,633,320 | A | * | 12/1986 | Willis .......................... 348/380 |
| 4,682,231 | A | * | 7/1987 | Yamakawa ................... 348/673 |
| 5,021,885 | A | * | 6/1991 | Kim ............................. 348/380 |
| 5,134,490 | A | * | 7/1992 | Neal ............................ 348/687 |
| 5,200,829 | A | * | 4/1993 | Lagoni ........................ 348/380 |
| 5,504,538 | A | * | 4/1996 | Tsujihara et al. ........... 348/673 |
| 5,596,375 | A | * | 1/1997 | Kwon ......................... 348/687 |
| 5,889,557 | A | * | 3/1999 | Sato ............................ 348/380 |
| 5,892,544 | A | * | 4/1999 | Ikegami et al. ............. 348/380 |
| 6,937,288 | B2 | * | 8/2005 | Hibi ........................... 348/380 |

* cited by examiner

*Primary Examiner*—Paulos M. Natnael
(74) *Attorney, Agent, or Firm*—Vedder, Price, Kaufman & Kammholz, P.C.

(57) ABSTRACT

Video signal control circuitry for use in a video display system in which a variation in a brightness level of a video display signal causes a corresponding variation in a beam current signal, wherein such video signal control circuitry maintains a controllable video display signal brightness level at a substantially constant average value notwithstanding a variation in the incoming video signal brightness level.

9 Claims, 1 Drawing Sheet

VIDEO DISPLAY SIGNAL BRIGHTNESS CONTROL CIRCUIT

BACKGROUND OF THE INVENTION

1. Field of the Invention

The present invention relates to control circuits for video display signals, and in particular, to circuits for controlling the brightness level of a video display signal.

2. Description of the Related Art

Circuits and techniques for controlling, e.g., limiting, the scanning beam current for a video display are well known in the art. These are particularly important for cathode ray tube (CRT) displays which typically require automatic brightness (or beam) limiter (ABL) circuits to ensure that the average CRT anode current does not exceed a predetermined value. This is important to not only maintain a desired brightness level for the display, but also to not damage or significantly reduce the useful life of the display.

SUMMARY OF THE INVENTION

In accordance with the presently claimed invention, video signal control circuitry is provided for use in a video display system in which a variation in a brightness level of a video display signal causes a corresponding variation in a beam current signal, wherein such video signal control circuitry maintains a controllable video display signal brightness level at a substantially constant average value notwithstanding a variation in the incoming video signal brightness level.

In accordance with one embodiment of the presently claimed invention, video signal control circuitry for use in a video display system in which a variation in a brightness level of a video display signal causes a corresponding variation in a beam current signal includes a control electrode to convey the beam current signal, control circuitry and amplifier circuitry. The control circuitry is coupled to the control electrode and responsive to the beam current signal and a brightness control signal by providing a gain control signal, wherein the gain control signal has a nominal value determined substantially by the brightness control signal and is variable about the nominal value in substantial relation to the beam current signal. The amplifier circuitry is coupled to the control circuitry and responsive to the gain control signal and an input video signal by providing the video display signal, wherein a ratio of the video display signal and the input video signal has a value determined substantially by the gain control signal. A substantially constant average video display signal brightness level is maintained notwithstanding a variation in a brightness level of the input video signal.

In accordance with one embodiment of the presently claimed invention, video signal control circuitry for use in a video display system in which a variation in a brightness level of a video display signal causes a corresponding variation in a beam current signal includes a control electrode to convey the beam current signal, control circuitry and amplifier circuitry. The control circuitry is coupled to the control electrode and responsive to the beam current signal by providing a gain control signal, wherein the gain control signal is variable in substantial relation to the beam current signal. The amplifier circuitry is coupled to the control circuitry and responsive to a brightness control signal, the gain control signal and an input video signal by providing the video display signal, wherein a ratio of the video display signal and the input video signal has a value determined substantially by the brightness and gain control signals. A substantially constant average video display signal brightness level is maintained notwithstanding a variation in a brightness level of the input video signal.

In accordance with still another embodiment of the presently claimed invention, video signal control circuitry for use in a video display system in which a variation in a brightness level of a video display signal causes a corresponding variation in a beam current signal includes controller means and amplifier means. The controller means is for receiving the beam current signal and a brightness control signal and in response thereto providing a gain control signal, wherein the gain control signal has a nominal value determined substantially by the brightness control signal and is variable about the nominal value in substantial relation to the beam current signal. The amplifier means is for receiving the gain control signal and an input video signal and in response thereto providing the video display signal, wherein a ratio of the video display signal and the input video signal has a value determined substantially by the gain control signal. A substantially constant average video display signal brightness level is maintained notwithstanding a variation in a brightness level of the input video signal.

In accordance with still another embodiment of the presently claimed invention, video signal control circuitry for use in a video display system in which a variation in a brightness level of a video display signal causes a corresponding variation in a beam current signal includes controller means and amplifier means. The controller means is for receiving the beam current signal and in response thereto providing a gain control signal, wherein the gain control signal is variable in substantial relation to the beam current signal. The amplifier means is for receiving a brightness control signal, the gain control signal and an input video signal and in response thereto providing the video display signal, wherein a ratio of the video display signal and the input video signal has a value determined substantially by the brightness and gain control signals A substantially constant average video display signal brightness level is maintained notwithstanding a variation in a brightness level of the input video signal.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
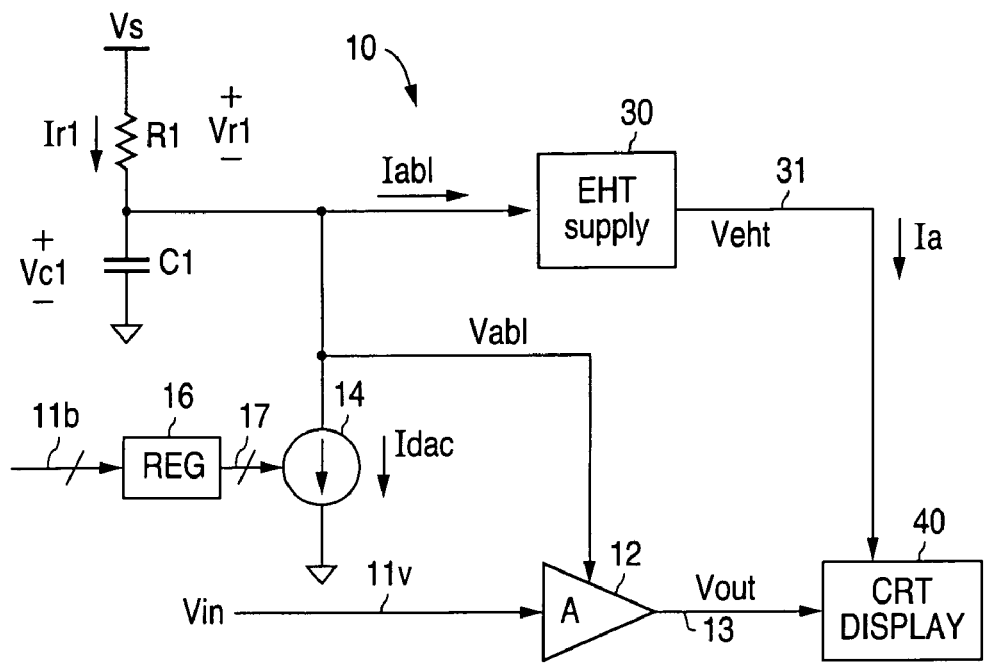
FIG. 1 is a functional block diagram depicting a video display system in which video signal control circuitry in accordance with one embodiment of the presently claimed invention is used for brightness control.

Referring to FIG. 1, a portion of a video display system implementing brightness control in accordance with the presently claimed invention includes video signal control circuitry 10 coupled to and interacting with a video display (e.g., CRT) 40 and its EHT (electrical high tension) power supply 30, interconnected substantially as shown. The video signal control circuitry 10 includes control circuitry and amplifier circuitry as follows. Connected between the power supply Vs and the circuit reference (e.g., circuit ground) is a lowpass filter in the form of a serially connected resistor R1 and capacitor C1. These components R1, C1 lowpass filter the current Ir1 through the resistor R1, thereby producing a lowpass filtered voltage Vc1 across the capacitor C1. Also connected to the node common to the resistor R1 and capacitor C1 is the EHT supply 30, a current source 14, and the gain control terminal for a video amplifier circuit 12. A beam current Iab1 flows into the EHT supply 30, and has a magnitude dependent upon the amount of supply current Ia (e.g., anode current) flowing to the display 40. In other words, an increase in the brightness of the video image being displayed by the display 40 causes increased supply current Ia to flow, thereby causing a corresponding increase in the beam current Iab1.

The current source 14 is controllable by a control signal 17, and is preferably a current DAC, i.e., a digital-to-analog converter that converts a digital control signal 17 to an analog current Idac. This digital signal 17 is provided by one or more data registers 16. The original control data 11$b$ stored in such registers 16 can be provided in a static manner for a constant brightness level, or can alternatively be provided in a dynamic manner for dynamic brightness control (discussed in more detail below). Such a current source circuit 14 is well-known in the art and can be implemented in any of a number of well-known ways.

The incoming video signal 11$v$, with its constituent average as well as instantaneous brightness levels, is buffered or amplified by the video amplifier circuit 12 to provide the video display signal 13 for the display 40. The gain A of the video amplifier circuit 12 is controlled with a gain control signal in the form of a control voltage Vab1 which appears across the current source circuit 14 and would be expected to be equal to the voltage Vc1 across the capacitor C1. In one embodiment, increases and decreases in this voltage Vab1 cause the amplifier gain A to increase and decrease, respectively, thereby producing corresponding increased and decreased brightness levels in the video display signal 13.

Operation of the control circuit 10 in conjunction with the EHT supply 30 and display 40 is in conformance with convention negative feedback circuit principles and can be described as follows. As the peak-to-peak amplitude of the incoming video signal 11$v$ increases, i.e., as the brightness level of the video signal Vin 11$v$ increases, so does the amplitude and brightness level of the video display signal Vout 13. Accordingly, the image displayed by the display 40 becomes brighter, thereby causing an increased supply current Ia to flow and, in turn, an increased beam current Iab1. This increased beam current Iab1 causes the current Ir1 through the resistor R1 to increase, thereby increasing the voltage drop Vr1 across the resistor R1. As a result, the control voltage Vab1 decreases, thereby causing the signal gain A of the video amplifier 12 to decrease. As a result, the video display signal 13 also decreases in amplitude, as does its brightness level. This, in turn, reduces the supply current Ia and beam current Iab1 until all signals converge to a final value. (It will be readily understood by one of ordinary skill in the art that the resistance and capacitance values of the resistor R1 and capacitor C1 can be appropriately selected so as to cause this feedback operation to operate as an appropriate automatic gain control (AGC) for the average brightness level of the video display signal 13.) Operation of this control circuit 10 when the incoming video signal 11$v$ decreases in amplitude and brightness level is similar, but with decreases and increases in the respective signal levels instead of increases and decreases, respectively.

Figure 2:
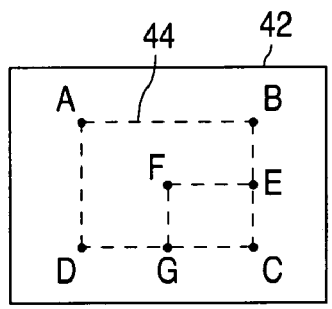
FIG. 2 depicts how video signal control circuitry in accordance with the presently claimed invention can be used to dynamically control brightness within a video display image.

Referring to FIG. 2, controlling the amount of current Idac being sunk by the current source circuit 14, in accordance with its control signal data 17, the nominal (e.g., average) brightness of the video display signal 13, about which any AGC-related variations occur, can be selectively controlled. For example, it may be desirable to "highlight" a portion 44 of the overall video image 42 being displayed by the display 40, i.e., display such image portion 44 at an increased or decreased brightness level. With the control circuit 10 of FIG. 1, such brightness control is easily achieved. For example, if it is desired to highlight a rectangular region as defined by vertices A, B, C and D, the appropriate control data 17 can be provided to the current source 14 during the time intervals corresponding to the scanning of such region 44. By increasing or decreasing the shunted current Idac, the average brightness level of the image being displayed will be decreased or increased, respectively. Alternatively, irregularly shaped regions can also be highlighted, such as the polygon defined by vertices A, B, E, F, G and D.

Figure 3:
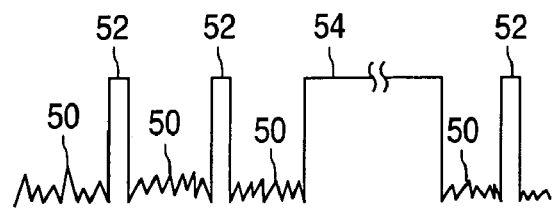
FIG. 3 illustrates a typical video signal including the horizontal and vertical blanking intervals.

As noted above, the control data 17 (e.g., initially stored in the registers according to input control data 11$b$) can be provided a priori based upon the desired region to be highlighted. Alternatively, such control data 11$b$ can be retrieved dynamically from the incoming video signal 11$v$. For example, referring to FIG. 3, if the incoming video signal 11$v$ has been encoded with the appropriate brightness control data, e.g., within a vertical blanking interval 54 or a horizontal blanking interval 52 (between the active video intervals 50, as well known in the art), such brightness control data can be retrieved and applied to the current source 14 as the corresponding active video regions 50 are processed by the amplifier circuitry 12.

In accordance with one implementation of one embodiment of the presently claimed invention, the resistance value of the resistor R1 was selected such that the beam current Iab1 is approximate 2 mA when the shunted current Idac is zero, i.e., for maximum brightness level of the displayed image, thereby resulting in the maximum beam current Iab1. During normal modes of operation, i.e., less than maximum brightness levels, the shunted current Idac can be adjusted to vary the onset of beam limiting as discussed above. For example, with reference to the following table, for a 4-bit control signal 17, example values of the shunted current Idac can be as shown:

| C[3] | C[2] | C[1] | C[0] | Current Sunk to GND |
|------|------|------|------|---------------------|
| 0 | 0 | 0 | 0 | 0 μA (highlight mode) |
| 0 | 0 | 0 | 1 | 80 μA |
| 0 | 0 | 1 | 0 | 160 μA |
| 0 | 0 | 1 | 1 | 240 μA |
| 0 | 1 | 0 | 0 | 320 μA |
| 0 | 1 | 0 | 1 | 400 μA |
| 0 | 1 | 1 | 0 | 480 μA |
| 0 | 1 | 1 | 1 | 560 μA |
| 1 | 0 | 0 | 0 | 640 μA |
| 1 | 0 | 0 | 1 | 720 μA |
| 1 | 0 | 1 | 0 | 800 μA |
| 1 | 0 | 1 | 1 | 880 μA |
| 1 | 1 | 0 | 0 | 960 μA |
| 1 | 1 | 0 | 1 | 1.04 mA |
| 1 | 1 | 1 | 0 | 1.12 mA |
| 1 | 1 | 1 | 1 | 1.20 mA |

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including video signal control circuitry for use in a video display system in which a variation in a brightness level of a video display signal causes a corresponding variation in a beam current signal, said video signal control circuitry comprising:
   a control electrode to convey said beam current signal;
   control circuitry coupled to said control electrode and responsive to said beam current signal and a brightness control signal by providing a gain control signal, wherein said gain control signal has a nominal value determined substantially by said brightness control signal and is variable about said nominal value in substantial relation to said beam current signal, and wherein said control circuitry includes
      lowpass filter circuitry coupled to said control electrode, and
      current source circuitry coupled to said lowpass filter circuitry and responsive to said brightness control signal by shunting a current via said lowpass filter circuitry; and
   amplifier circuitry coupled to said control circuitry and responsive to said gain control signal and an input video signal by providing said video display signal, wherein a ratio of said video display signal and said input video signal has a value determined substantially by said gain control signal;
   wherein a substantially constant average video display signal brightness level is maintained notwithstanding a variation in a brightness level of said input video signal.

2. The apparatus of claim 1, wherein said current source circuitry comprises digital-to-analog conversion circuitry responsive to a digital signal as said brightness control signal by shunting an analog current via said lowpass filter circuitry.

3. The apparatus of claim 2, further comprising digital storage circuitry coupled to said digital-to-analog conversion circuitry to provide said digital signal.

4. An apparatus including video signal control circuitry for use in a video display system in which a variation in a brightness level of a video display signal causes a corresponding variation in a beam current signal, said video signal control circuitry comprising:
   a control electrode to convey said beam current signal;
   control circuitry coupled to said control electrode and responsive to said beam current signal and a brightness control signal by providing a gain control signal, wherein said gain control signal has a nominal value determined substantially by said brightness control signal and is variable about said nominal value in substantial relation to said beam current signal; and
   amplifier circuitry coupled to said control circuitry and responsive to said gain control signal and an input video signal by providing said video display signal, wherein a ratio of said video display signal and said input video signal has a value determined substantially by said gain control signal, and wherein said amplifier circuitry includes a video amplifier circuit with a variable gain controllable via said gain control signal;
   wherein a substantially constant average video display signal brightness level is maintained notwithstanding a variation in a brightness level of said input video signal.

5. An apparatus including video signal control circuitry for use in a video display system in which a variation in a brightness level of a video display signal causes a corresponding variation in a beam current signal, said video signal control circuitry comprising:
   a control electrode to convey said beam current signal;
   control circuitry coupled to said control electrode and responsive to said beam current signal by providing a gain control signal, wherein said gain control signal is variable in substantial relation to said beam current signal; and
   amplifier circuitry coupled to said control circuitry and responsive to a brightness control signal, said gain control signal and an input video signal by providing said video display signal, wherein a ratio of said video display signal and said input video signal has a value determined substantially by said brightness and gain control signals, and wherein said amplifier circuitry includes
      current source circuitry responsive to said brightness control signal by shunting a current via said control circuitry, and
      a video amplifier circuit coupled to said current source circuitry with a variable gain controllable via said gain control signal;
   wherein a substantially constant average video display signal brightness level is maintained notwithstanding a variation in a brightness level of said input video signal.

6. The apparatus of claim 5, wherein said current source circuitry comprises digital-to-analog conversion circuitry responsive to a digital signal as said brightness control signal by shunting an analog current via said control circuitry.

7. The apparatus of claim 6, further comprising digital storage circuitry coupled to said digital-to-analog conversion circuitry to provide said digital signal.

8. An apparatus including video signal control circuitry for use in a video display system in which a variation in a brightness level of a video display signal causes a corresponding variation in a beam current signal, said video signal control circuitry comprising:

controller means for receiving said beam current signal and a brightness control signal and in response thereto providing a gain control signal, wherein said gain control signal has a nominal value determined substantially by said brightness control signal and is variable about said nominal value in substantial relation to said beam current signal; and amplifier means for receiving said gain control signal and an input video signal and in response thereto providing said video display signal, wherein a ratio of said video display signal and said input video signal has a value determined substantially by said gain control signal, and wherein said control means includes lowpass filter means, and current source means for receiving said brightness control signal and in response thereto shunting a current via said lowpass filter means;

wherein a substantially constant average video display signal brightness level is maintained notwithstanding a variation in a brightness level of said input video signal.

9. An apparatus including video signal control circuitry for use in a video display system in which a variation in a brightness level of a video display signal causes a corresponding variation in a beam current signal, said video signal control circuitry comprising:

controller means for receiving said beam current signal and in response thereto providing a gain control signal, wherein said gain control signal is variable in substantial relation to said beam current signal; and amplifier means for receiving a brightness control signal, said gain control signal and an input video signal and in response thereto providing said video display signal, wherein a ratio of said video display signal and said input video signal has a value determined substantially by said brightness and gain control signals, and wherein said amplifier means includes current source means for receiving said brightness control signal and in response thereto shunting a current via said controller means, and video amplifier means for providing a variable gain controllable via said gain control signal;

wherein a substantially constant average video display signal brightness level is maintained notwithstanding a variation in a brightness level of said input video signal.

* * * * *

UNITED STATES PATENT AND TRADEMARK OFFICE
CERTIFICATE OF CORRECTION

| | | |
|---|---|---|
| PATENT NO. | : 7,277,135 B1 | Page 1 of 1 |
| APPLICATION NO. | : 10/897522 | |
| DATED | : October 2, 2007 | |
| INVENTOR(S) | : Hojabri et al. | |

It is certified that error appears in the above-identified patent and that said Letters Patent is hereby corrected as shown below:

At patent column 3, line 36, please delete "lab1" and insert --labl--;

At patent column 3, line 42, please delete "lab1" and insert --labl--;

At patent column 3, line 59, please delete "Vab1" and insert --Vabl--;

At patent column 3, line 62, please delete "Vab1" and insert --Vabl--;

At patent column 4, line 9, please delete "lab1" and insert --labl--;

At patent column 4, line 12, please delete "Vab1" and insert --Vabl--;

At patent column 4, line 16, please delete "lab1" and insert --labl--;

At patent column 4, line 63, please delete "lab1" and insert --labl--;

Signed and Sealed this

Fourth Day of December, 2007

JON W. DUDAS
*Director of the United States Patent and Trademark Office*